(12) United States Patent
Pels et al.

(10) Patent No.: US 10,166,515 B2
(45) Date of Patent: Jan. 1, 2019

(54) METHOD OF PREPARING AN EMULSION, A DEVICE FOR PREPARING SAID EMULSION, AND A VEHICLE

(71) Applicant: OCRI B.V., Amsterdam (NL)

(72) Inventors: Wilko Karel Anthonius Pels, Amsterdam (NL); Oebele Herman Bruinsma, Rooden (NL)

(73) Assignee: OCRI B.V., Amsterdam (NL)

( * ) Notice: Subject to any disclaimer, the term of this patent is extended or adjusted under 35 U.S.C. 154(b) by 0 days.

(21) Appl. No.: 15/516,599

(22) PCT Filed: Oct. 2, 2015

(86) PCT No.: PCT/NL2015/050694
§ 371 (c)(1),
(2) Date: Apr. 3, 2017

(87) PCT Pub. No.: WO2016/053106
PCT Pub. Date: Apr. 7, 2016

(65) Prior Publication Data
US 2017/0291149 A1    Oct. 12, 2017

(30) Foreign Application Priority Data

Oct. 4, 2014 (NL) ........................ 2013573
Jul. 1, 2015 (NL) ........................ 2015063

(51) Int. Cl.
*B01F 5/04*       (2006.01)
*B01F 5/10*       (2006.01)
(Continued)

(52) U.S. Cl.
CPC .......... *B01F 3/0811* (2013.01); *B01F 3/0865* (2013.01); *B01F 5/048* (2013.01);
(Continued)

(58) Field of Classification Search
CPC ...... B01F 3/0811; B01F 5/0473; B01F 5/048; B01F 3/0865; B01F 5/10;
(Continued)

(56) References Cited

U.S. PATENT DOCUMENTS 4,986,858 A * 1/1991 Oliver .................. B01F 3/0807
149/109.6
5,125,367 A * 6/1992 Ulrich .................. B01F 3/0807
123/25 E
(Continued)

FOREIGN PATENT DOCUMENTS

DE       19650559 C1    3/1998
EP       3002055 A1 *   4/2016    ............ B01F 5/0471
(Continued)

OTHER PUBLICATIONS

International Search Report for PCT/NL2015/050694 dated Mar. 15, 2016.
(Continued)

*Primary Examiner* — Charles Cooley
(74) *Attorney, Agent, or Firm* — Tully Rinckey PLLC; Steven M. Hoffberg

(57) ABSTRACT

A method and device of preparing an emulsion comprising a first liquid and a second liquid, said method comprising the step of dispersing the first liquid into the second liquid, characterized in that the method comprises:—passing the first liquid through an injection nozzle (108) for creating a spray of droplets of the first liquid, and—injecting thus created droplets of first liquid into the second liquid such that Q, where Q is equal to the square of the speed of the droplets, is at least 225 $m^2/s^2$; wherein W, wherein W is sg*Q*d divided by St with sg being the specific gravity of the first liquid in $kg/m^3$, d being the mean Sauter droplet diameter in meter of the spray leaving the injection nozzle (Continued)

in air, and St being the surface tension of the first liquid in Newton/meter; is at least 250 kg*m/N*s².

18 Claims, 4 Drawing Sheets

(51) Int. Cl.
  *B01F 3/08* (2006.01)
  *F02M 25/022* (2006.01)
(52) U.S. Cl.
  CPC .......... *B01F 5/0471* (2013.01); *B01F 5/0473* (2013.01); *B01F 5/10* (2013.01); *F02M 25/0221* (2013.01); *F02M 25/0227* (2013.01); *F02M 25/0228* (2013.01); *B01F 2003/0842* (2013.01); *B01F 2215/0088* (2013.01); *B01F 2215/0409* (2013.01); *Y02T 10/121* (2013.01)
(58) Field of Classification Search
  CPC .. B01F 2003/0842; B01F 5/102; B01F 5/104; B01F 5/106; B01F 5/108; F02M 25/0228; F02M 25/0227; F02M 25/0221
  USPC ......... 366/167.1, 173.1, 173.2, 174.1, 175.2, 366/181.5, 336–341, 176.1; 138/37–40, 138/42–44, 46; 48/189.4
  See application file for complete search history.

(56) References Cited

U.S. PATENT DOCUMENTS

| | | | | |
|---|---|---|---|---|
| 5,245,953 A | * | 9/1993 | Shimada | ................. F02B 45/00 123/25 C |
| 5,324,109 A | * | 6/1994 | Johari | ................... B01F 3/0865 366/152.1 |
| 2013/0121102 A1 | * | 5/2013 | Ng | ........................ B01F 3/0807 366/173.2 |
| 2017/0291149 A1 | * | 10/2017 | Pels | ...................... B01F 3/0811 |

FOREIGN PATENT DOCUMENTS

| | | | |
|---|---|---|---|
| JP | 58067325 A | * | 4/1983 |
| WO | 80/02807 | * | 12/1980 |
| WO | 91/00139 A1 | | 1/1991 |
| WO | 2011/040837 A1 | | 4/2011 |

OTHER PUBLICATIONS

Written Opinion of the International Searching Authority for PCT/NL2015/050694 dated Mar. 15, 2016.

* cited by examiner

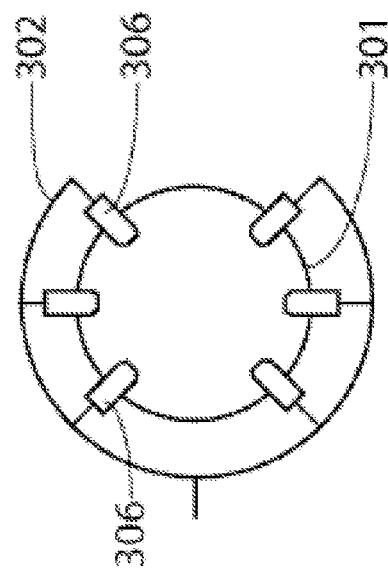
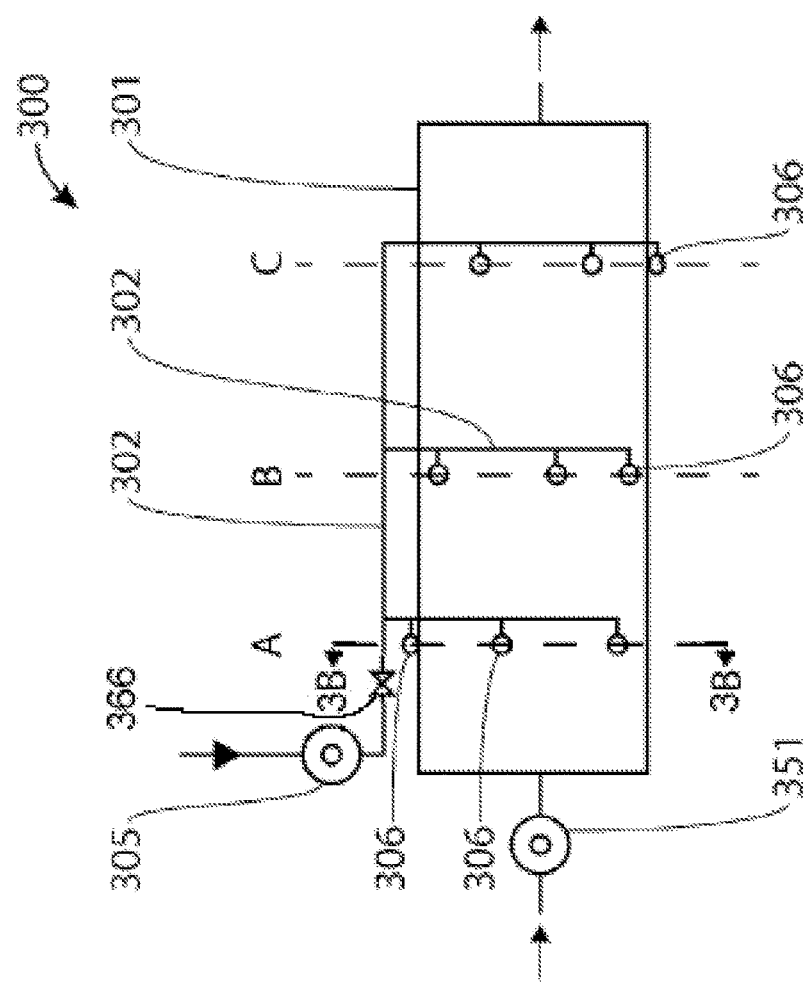
Fig. 3A
Fig. 3B

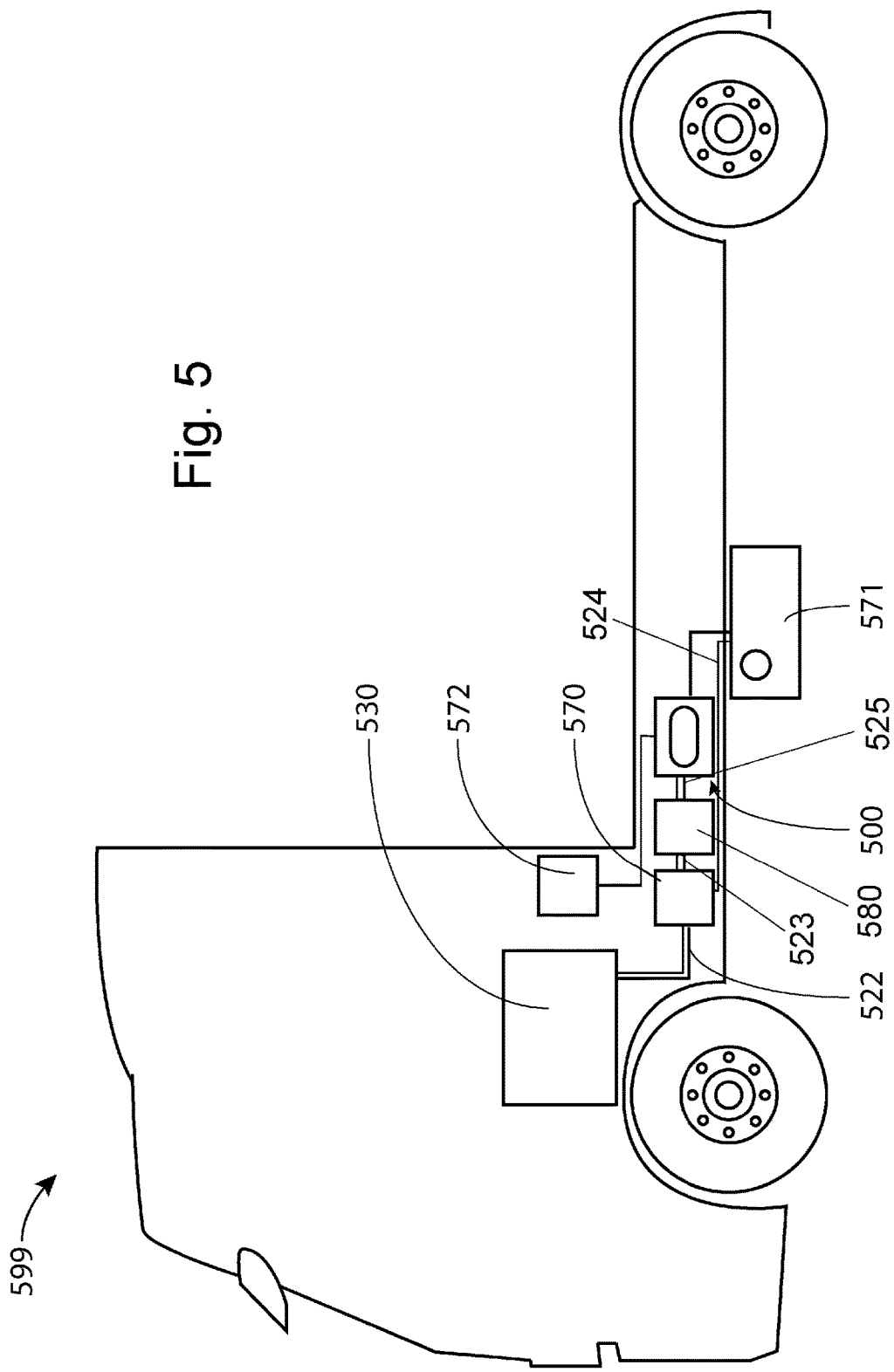

METHOD OF PREPARING AN EMULSION, A DEVICE FOR PREPARING SAID EMULSION, AND A VEHICLE

CROSS REFERENCE TO RELATED APPLICATIONS

The present application is a National Stage filing under 35 U.S.C. § 371 of PCT/NL2015/050694, filed Oct. 2, 2015, and which claims benefit of priority from Netherlands patent application Nos. NL2013573, filed Oct. 4, 2014 and NL2015063, filed Jul. 1, 2015, each of which is expressly incorporated herein by reference. This application is related to EP 3,002,055, published Apr. 6, 2016, based on application EPA 15188271.9, filed Oct. 2, 2015, which is expressly incorporated herein by reference.

FIELD OF THE INVENTION

The present invention relates to a method of preparing an emulsion comprising a first liquid and a second liquid, said method comprising the step of dispersing the first liquid into the second liquid.

BACKGROUND OF THE INVENTION

It is generally known in the art of making emulsions that the smaller the droplets are, the longer the emulsion will be stable.

Various methods are known for the preparation of an emulsion from immiscible liquids, optionally making use of a stabilizing agent to enhance the stability of the emulsion prepared. Such a method comprises breaking up the first liquid into small droplets, e.g. by rotation of an impeller in a container comprising the first liquid and the second liquid, or by applying ultrasound to a pre-mixture of said liquids.

A method of forming an emulsion is known from U.S. Pat. No. 7,629,390, expressly incorporated herein by reference, which describes the preparation of a stable water-in-oil emulsion with the aid of stirring and pumping.

The objective of the present invention is to provide an alternative method.

SUMMARY OF THE INVENTION

To this end, the present invention is characterized in that it comprises:
passing the first liquid through an injection nozzle for creating a spray of droplets of the first liquid, and
injecting thus created droplets of first liquid into the second liquid such that Q, where Q is equal to the square of the speed of the droplets, is at least 225 $m^2/s^2$;
wherein W, where
W is sg*Q*d divided by St with
sg being the specific gravity of the first liquid in $kg/m^3$,
d being the mean Sauter droplet diameter in meter of the spray leaving the injection nozzle in air, and
St is the surface tension of the first liquid in Newton/meter;
is at least 250 $kg*m/N*s^2$.

The high speed causes injected droplets of the spray produced by the nozzle to further break up in the second liquid, i.e. in the bulk of the second liquid itself, reducing or obviating the need to subject the resulting emulsion to further emulsifying shearing forces using further mechanical means (such as an impeller, gears of a gear pump emulsifier, etc.) that would also increase the temperature of the second liquid and thus be less energy efficient. The process results in the droplets of the first liquid, for example water, being dispersed in the second liquid, for example a fuel such as diesel, even without stirring, although a concomitant or subsequent homogenization is preferred. The method allows for the production of the emulsion relatively quickly and in significant quantities. The volume of the equipment needed is relatively small.

Because the breaking up of the first liquid occurs almost immediately upon injection, the processing time for preparation of the emulsion can be reduced. Furthermore, the method allows preparation of emulsions in small volumes at a time, if such is desired. The method is also suitable for continuous preparation, which will be advantageous for some of the many applications that emulsions serve in the world.

The droplet size distribution is to be determined using a Phase Doppler Particle Analyzer, in particular using a PDPA of TSI Incorporated. Using the density of the first liquid, the mass can be calculated for droplets of that size. The mean Sauter droplet diameter is similarly determined with such a device.

The injection of the first liquid into the second liquid may be done through a gap, such as an air gap, between the nozzle and the second liquid, but it has been found to be more effective that injection occurs directly into the second liquid, i.e. with the nozzle being submerged in the second liquid. This has been found to reduce the formation of foam.

In an important application of the present invention, the first liquid is an aqueous liquid, preferably water, and the second liquid is a hydrocarbon-comprising liquid, in particular a fuel such as fuel oil. Preferred fuels comprise gasoline and kerosene, and most preferred is diesel. Emulsions prepared can be used to achieve significant savings in fuel consumption. An diesel emulsion will for example contain 0.2 to 10 vol. % water, preferably 1 to 7 vol. %. A gasoline emulsion will for example contain 0.1-2 vol. %, preferably 0.2-1.5 vol. %

In general, the pressure drop over the nozzle will be at least 10 and preferably at least 15 bar, so as to inject created droplets of a relatively small size. In practice, the pressure drops used will be much higher, such as at least 20 bar, preferably at least 30 bar.

This important application is not to say that other applications bear no relevance. Indeed, the method according to the invention can be used to prepare emulsions for the food or pharmaceutical industry, as desired.

In the case of the second liquid comprising a fuel, it has been found advantageous if the fuel emulsion comprises mannitol, which was found to stabilize the emulsion and helps to maintain the stability of the emulsion below 0° C.

If the first liquid is water, the water may be any water, but especially in the case of a fuel as second liquid it is preferred to have water having an electrical conductivity of more than 50 µS/cm, preferably more than 100 µS/cm (both when measured at 25° C. This was found to have a stabilizing effect relative to water having a lower conductivity.

With the method according to the invention, it is recommended to avoid local high concentrations of first liquid in the second liquid. This can be promoted by pulse-wise injection, as the impulse of the injection entrains the second liquid as a result of which fresh second liquid is moved in front of the injection nozzle. However, active homogenization and/or removal of emulsion formed in front of the nozzle is preferred. This can be achieved by stirring, pumping etc.

For the highest yield of emulsion, it should be avoided that the droplets leaving the nozzle and moving through the second liquid hit an opposite wall of a container or other chamber in which the injection is performed. However, according to a preferred embodiment, an emulsion formed relatively close to the injection nozzle is separated from first liquid that has travelled over a particular path length from the nozzle. The effect is that there is a selection for relatively smaller droplets leaving the nozzle, which are decelerated more quickly than larger droplets.

It is preferred that the first liquid is an aqueous liquid. The second liquid is preferably a liquid that is immiscible with water. The method may include the addition of additives such as an emulsion stabilizing agent, which are well known in the art.

Q can be calculated based on the exit speed of the first liquid from the nozzle in air under standard temperature (20° C.) and ambient air pressure (1 atm). This exit speed can be calculated from the flow rate through the injection nozzle and the cross-sectional surface are of the nozzle opening.

It is preferred that the droplets are injected at a higher speed, such that Q is at least 900 m$^2$/s$^2$, and more preferably at least 2209 m$^2$/s$^2$. This results in emulsions that will remain stable for longer periods of time.

In general, the droplets of the spray have a diameter of less than 200 micrometer. Preferably, the droplets of the spray have a diameter of less than 100 micrometer, more preferably less than 75 micrometer and most preferably less than 50 micrometer.

Preferably, the droplets of the spray have a mean Sauter diameter of less than 100 micrometers, more preferably less than 40 micrometers, even more preferably less than 15 micrometers and most preferably less than 6 micrometers. This enables the preparation of emulsions that are sufficiently long stable for use as fuel. It also reduces the risk of droplets hitting an opposite wall, which might result in coalescence.

WO2012011873 and GB2233572 disclose a method of preparing an emulsion by injecting a jet, i.e. not a spray, of water by a nozzle into a highly turbulent second liquid. The highly turbulent mixing conditions require a significant amount of energy, causing a rise in temperature of the resulting emulsion. This adversely affects its stability.

According to a favorable embodiment, the temperature of the first liquid is at least 10° C. higher than the temperature of the second liquid.

Thus the viscosity and/or surface tension of the first liquid is reduced, facilitating break-up in the second liquid. Preferably the temperature difference is at least 20°.

According to a favorable embodiment, before spraying at least one operation chosen from i) the first liquid is heated, and ii) the second liquid is cooled is performed.

Raising the temperature will in general be done with at least 5° C., preferably at least 10° C., more preferably at least 20° C. Similarly, lowering the temperature will in general be done with at least 5° C., preferably at least 10° C., more preferably at least 20° C. In case the method is performed with a device on a vehicle such as a car or truck, the airco may be used for cooling the second liquid (including an emulsion comprising second liquid) into which the first liquid is injected. Heat from the engine may be used for heating the first liquid.

According to a favorable embodiment, W is at least 500 kg*m/N*s$^2$, preferably at least 960 kg*m/N*s$^2$, more preferably at least 1250 kg*m/N*s$^2$, even more preferably at least 2500 kg*m/N*s$^2$ and most preferably at least 5000 kg*m/N*s$^2$.

This results in a more stable emulsion. It is even more preferred if W is more than 8*103 kg*m/N*s$^2$, in particular more than 104 kg*m/N*s$^2$. For W values of 960 kg*m/N*s$^2$ or more, it is preferred that Q is at least 900 m2/s$^2$.

According to a favorable embodiment, the injection is performed with a fluctuating flow rate of the first liquid passed to the injection nozzle.

By fluctuating the injection of the first liquid into the second liquid, preferably cyclically, the stability of the resulting emulsion has been found to be improved. This may be caused by reducing the risk of local high concentrations of the injected first liquid, e.g. because the injected first liquid has moved away from the nozzle and is replaced by fresh second liquid. The term fluctuating means that in any timespan of 1 minute, the lowest flow rate is less than 30% of the highest flow rate in that time interval, preferably less than 10% and most preferably 0%. Preferably there is a great number of periods having such a low flow rate, with a pulse duration of, for example, less than 1 seconds, preferably less than 0.2 second, more preferably less than 0.05 seconds. The amount injected per pulse is usually less than 5 ml per period, preferably less than 2 ml per period (pulse), more preferably less than 1 ml per period.

According to a favorable embodiment, the second liquid is passed along the injection nozzle.

This active movement of the second liquid reduces the risk of local relatively high concentrations of the first liquid, which could result in coalescence thereof and hence reduced stability of the emulsion, an in particular segregation of first liquid from the emulsion.

A favorable way of operating is continuous spraying of the first liquid, wherein the flow rate of the second liquid is relatively high to the flow rate of the first liquid, e.g. in a ratio of at least 70, preferably at least 120 and more preferably at least 200 and most preferably at least 400. Relative low ratios are suitable for one-pass injection, whereas the higher ratios are preferred for multi-pass injections with recirculation of emulsion formed or for single-pass emulsion formation with multiple consecutive injections downstream of one another. It is preferred that at the location of injection of the first liquid, the second liquid has a Reynold's number of less than 25000, more preferably less than 22000, even more preferably less than 17000 and most preferably less than 12000 so as to reduce the energy required for preparing the emulsion and/or avoid a significant rise in temperature that could affect the stability of the resulting emulsion.

The resulting emulsion may be homogenized before more first liquid is injected, e.g. by positioning two or more injection nozzles along the flow for the stepwise injection, in order to gradually obtain the desired concentration of the first liquid in the emulsion. The number of consecutive injections is for example at least 5, preferably at least 10.

The second liquid may be passed in a first direction along the nozzle, and the injection of first liquid is done in a second direction, wherein the first direction has an inclination angle to the second direction that lies between 30 and 180 degrees (where 180° being that the average direction of the spray is the same as that of the flow of the second liquid), preferably between 45 and 135 degrees.

According to a favorable embodiment, the injection of first liquid is done in more than one injection step.

Such a low dosing is useful in the case of continuous injection and pulsed injection, either or not with recirculation, and appears to result in a higher stability of the resulting emulsion. Recirculation is currently preferred. The amount injected per pulse is usually less than 5 ml per period, preferably less than 2 ml per period (pulse), more preferably less than 1 ml per period.

According to a favorable embodiment, a circulation circuit is used comprising an injection section where the first liquid is injected, and the method comprises the step of circulating the emulsion comprising second liquid through the circulation circuit before injecting more first liquid into said emulsion.

Thus the concentration of the first liquid is stepwise increased, and has been found to be beneficial to the formation of relatively more stable emulsions. The number of injection steps is preferably at least 5, more preferably at least 10. Recirculation promotes homogenization and reduces the risk of local high concentrations that could more easily result in coalescence of the first liquid. Homogenization can be enhanced in any manner, such as using a static mixer (e.g. downstream or in the injection section, but slightly upstream will also work), the pump used for recirculation, means for actively mixing such as a low speed impeller etc. A circulation circuit is a circuit comprising one or more conduits, a pump and one or more control valves, as known in the art.

According to a favorable embodiment, a circulation circuit is used comprising
an injection section where the first liquid is injected, and
a sump; and
the method comprises the step of draining segregated first liquid from said sump.

Should first liquid segregate from the emulsion, it will be collected in the sump. Such a sump is for example advantageous if the circulation circuit is not used for a sustained period of time while containing emulsion. If the first liquid has a density lower than the second liquid, it will float and the term sump includes a section of the circulation circuit where the first liquid accumulates.

Advantageously, the segregated first liquid is re-injected. This provides reuse of the segregated first liquid, thus reducing the amount of waste produced.

According to a favorable embodiment, at least one of i) the first liquid, and ii) the second liquid is subjected to a degassing treatment before injecting the droplets into the second liquid.

It has been found that this appears to improve the formation of smaller droplets. Degassing (removal of air) may be performed in any manner, such as by a change in temperature and/or reduced pressure. In any case it is preferred that free gas is absent. It is even more preferred that at least one the first liquid and the second liquid is not saturated in gas, preferably both.

According to a favorable embodiment, the first liquid is injected in a container providing a free path length for the spray from the nozzle that is larger than the penetration depth of the spray in the second liquid.

Thus coalescence of first liquid at a wall opposite of the nozzle is avoided. The width of the container will be chosen such that it is wider than the width of the spray cone from the nozzle.

The present invention also relates to a device for preparing an emulsion comprising a first liquid and a second liquid, said device comprising a chamber, and an organ for dispersing the first liquid into the second liquid, wherein the organ comprises an injection nozzle with an inlet for first liquid and outlet for created droplets of the first liquid, the injection nozzle opening up in the chamber, the device further comprising a pump for passing the first liquid to the injection nozzle, the pump and the injection nozzle being capable of creating a spray of water droplets in air with an exit speed such that Q, where Q is equal to the square of said exit speed of the droplets, is at least 225 $m^2/s^2$.

Such a device is suitable for performing the method according to the invention. The device according to the invention is suitable for batch-wise and for continuous operation, as desired.

It should be noted that in the present application in conjunction with the injection nozzle, the term "pump" is a functional term, and refers to any means that is capable of passing the first liquid through the nozzle while generating a spray of droplets, e.g. a displacement pump, an impeller, and/or pressurized container. A typical pressure difference required for realizing the aforementioned minimum value of Q over the injection nozzle is 7 Bar or higher, such as 10 Bar or higher. If the injection nozzle comprises a check valve to avoid leakage, the pressure values mentioned before a net values, i.e. the value of a pressure difference that can be measured over injection nozzle the minus the pressure value needed to overcome the check valve.

In conjunction with this independent claim, the term air means air at atmospheric pressure (1 Bar) at 20° C.

It is preferred that the device is capable of injecting droplets with a value for Q of at least 900 $m^2/s^2$, preferably at least 2209 $m^2/s^2$. Such a device is capable of preparing emulsions that are more stable than devices only achieving lower values of Q.

According to a favorable embodiment, the device comprises a fluid valve arranged between the pump and the injection nozzle, and a control unit arranged to control said fluid valve for varying the flow rate of first liquid passed to the injection nozzle.

This allows the device to be operated in a pulsed manner. It is preferred that the device comprises a further pump for passing the second liquid through the chamber. This helps to reduce the risk of local elevated concentrations of first liquid that could result in coalescence thereof, leading to a reduced stability of the emulsion formed. The pump can be any pump, and for most applications will only need to operate at reduced pressure, e.g. less than 1 Bar overpressure (compared to atmospheric pressure).

According to a favorable embodiment, the device comprises a circulation circuit, said circulation circuit comprising a circulation pump for circulating emulsion, an inlet for a liquid comprising the second liquid, and an outlet for discharging emulsion.

The injection section may be between the inlet for liquid comprising the second liquid and/or it may be part of the circulation circuit. The latter embodiment allows for a gradual increase of the concentration of first liquid in the emulsion in the circulation circuit, thus avoiding local high concentrations of said first liquid. In this case, the further pump mentioned above will be the circulation pump. Both embodiments allow for homogenization in the circulation circuit. A circulation system is already known for passing fuel to a combustion engine of a vehicle such as a truck. This circulation system is advantageously part of the device according to the invention.

Finally, the present invention relates to vehicle comprising a combustion engine for propulsion of the vehicle, wherein the vehicle comprises a device according to any of the claims 10-13 with an emulsion discharge opening of the device connected for liquid communication to a fuel inlet of said combustion engine.

Non-limiting examples of vehicle types in which the device may be advantageously applied are motorcycles, cars, trucks, ships and airplanes.

BRIEF DESCRIPTION OF THE DRAWINGS

The invention will now be illustrated with reference to the example section below, and with reference to the drawing wherein

FIG. 3A schematically shows a side view in elevation of a third embodiment of a device according to the invention arranged for continuous processing;

FIG. 3B schematically shows a cross section of the device of FIG. 3A taken along plane 3B-3B;

FIG. 5 shows a schematic side view of a vehicle comprising a device according to the invention.

DETAILED DESCRIPTION OF THE PREFERRED EMBODIMENTS

Figure 1:
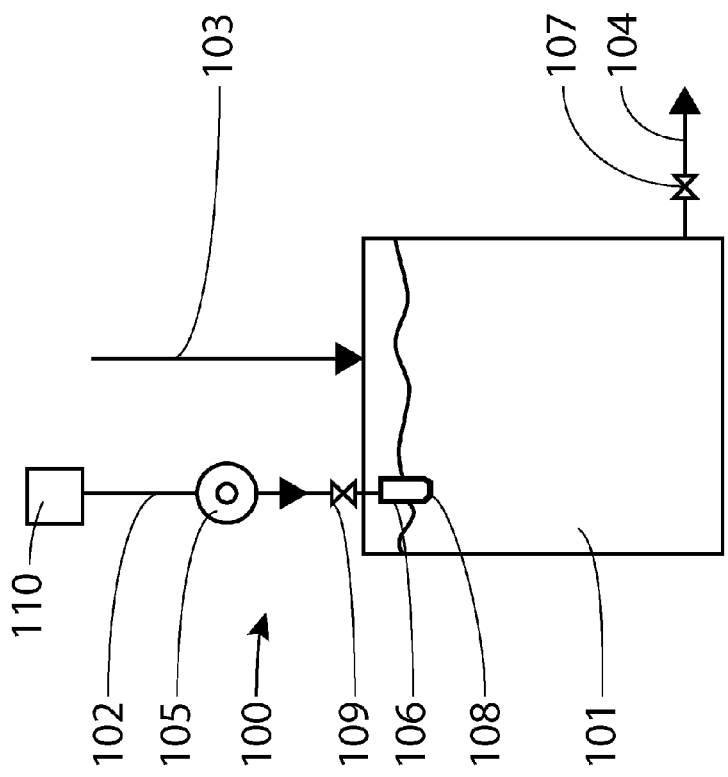
FIG. 1 shows a schematic diagram of a first embodiment of a device according to the invention arranged for batch processing.

FIG. 1 shows a device 100 for preparing an emulsion that comprises a first vessel 101 serving as a processing vessel and provided with a supply conduit 102 for an aqueous first liquid, a supply conduit 103 for a second liquid and a discharge conduit 104 for emulsion. The supply conduit 102 for aqueous first liquid contains a supply pump 105, in this example a centrifugal pump, and ends at a injector 106. In the shown embodiment, the injector is a commercially available type of injector, provided by ERL ltd in Sussex, BN10BHF England, part number 806-508B.

The discharge conduit 104 for emulsion comprises a valve 107 for enabling batch-wise operation of the method in the first vessel 101.

When the device is operated, the processing vessel 101 is first partly filled with second liquid, in this example diesel fuel, via the supply conduit 103, and the valve 107 is in a closed state. In this example, the surface level of the second liquid is higher than that of the lower end of the injector 106, which end comprises an injection nozzle 108 (Aquamist 806-508B, Aquamist, UK) located inside the first vessel 101.

Next, the supply pump 105 is activated, and aqueous first liquid, in this example tap water, is pressurized and passed to the injector 106 and in particular its injection nozzle 108, and then injected into the diesel fuel in the first vessel 101.

The supply pump 105 is chosen and operated to apply a sufficiently high pressure to the liquid exiting the supply pump 105 to provide the water droplets created by the injection nozzle 108 with a high speed, i.e. kinetic energy, to distribute the first liquid into the second liquid as very small particles and to thus create a relatively stable emulsion.

The injection of water into the diesel causes the diesel in the first vessel 101 to circulate within the first vessel 101, thus refreshing the second liquid in front of the injection nozzle 108. Continued injection may however lead to a local relatively high concentration of water droplets and thus to coalescence. The second liquid is preferably stirred to avoid this.

In order to improve the control over the injection process, the device 100 is also provided with a valve 109 and a heated water storage tank 110. The valve 109 (as commercially available from ERL ltd in Sussex, BN10BHF England, part number 806-243B) is operated by a computer (not shown) in order to allow for short pulses, or shots, of water into the vessel 101. This allows for more time to move the injected water away from the nozzle. The heated water storage tank 110 serves to reduce the effect of the sudden opening and closing of the valve 109, in case that might otherwise adversely affect the life span of the pump 105.

The first vessel 101 should be sufficiently large to avoid that injected aqueous first liquid collides with a wall of said vessel and/or avoid a location and orientation of injection that could cause the droplets leaving the nozzle from hitting a wall as water could accumulate there, which would lead to water segregating instead of being dispersed into the diesel.

It should also be understood that the amount of aqueous first liquid injected into the processing vessel will be chosen to be small enough to avoid immediate coalescence of water, which would reduce the effectiveness of the method.

Figure 2:
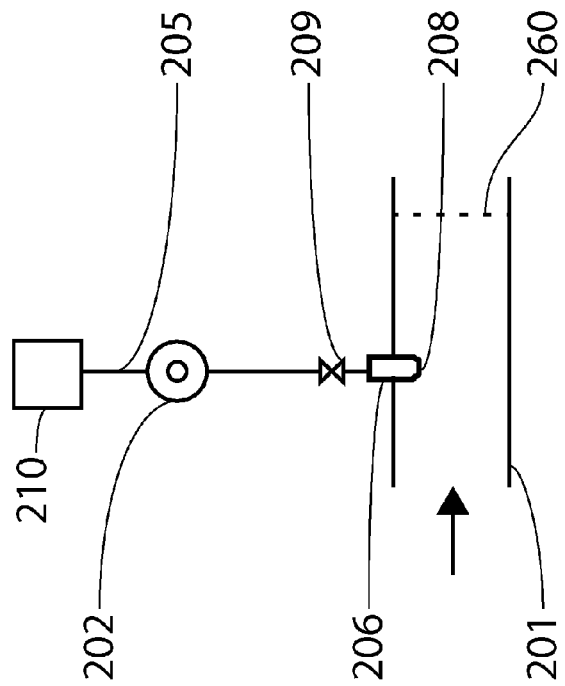
FIG. 2 shows a schematic diagram of a second embodiment of a device according to the invention arranged for continuous processing.

In FIG. 2, a device 200 for continuous processing is shown. Here, the vessel 101 has been replaced by a tube 201 of which only a part is shown. A supply conduit 202 for aqueous first liquid runs from a storage tank 210 for said first liquid via a supply pump 205, and a valve 209 to the tube 201. At the end of the supply conduit 202 there is an injector 206 with an injection nozzle 208. The second liquid is passed along the injection nozzle 208, which is oriented transverse to the direction in which droplets are injected, thus ensuring that injection takes place in fresh second liquid.

Downstream of the injection section of the device 200, there is a static mixer 260, here a mesh that allows for improved homogenization of the emulsion prepared in the injection section where the nozzle injects the first liquid.

In FIGS. 3A and 3B, the device 300 is a modified version of the device 200 for continuous processing of FIG. 2, device 300 allowing for bulk production of emulsion.

A supply conduit 302 for aqueous first liquid is provided with a supply pump 305 and ends in a plurality (18) injectors 306, which injectors 306 open up in tube 301 and in three different cross-sectional planes A, B and C of the tube 301, six in each plane, equally distributed over the circumference of the tube 301 in the respective plane A, B or C.

Seen along the longitudinal direction of the tube 301, the injectors in plane B are somewhat staggered with respect to the injectors 306 in plane A, and the injectors in plane C are somewhat staggered to the injectors 306 in plane B. This staggering serves to reduce the risk of local high concentrations of first liquid.

The tube 301 is fed using supply pump 351.

In FIG. 3B, a cross sectional view is shown over the plane 3B-3B in FIG. 3A. The injectors 306 are visible as distributed over the circumference of the tube 301.

Figure 4:
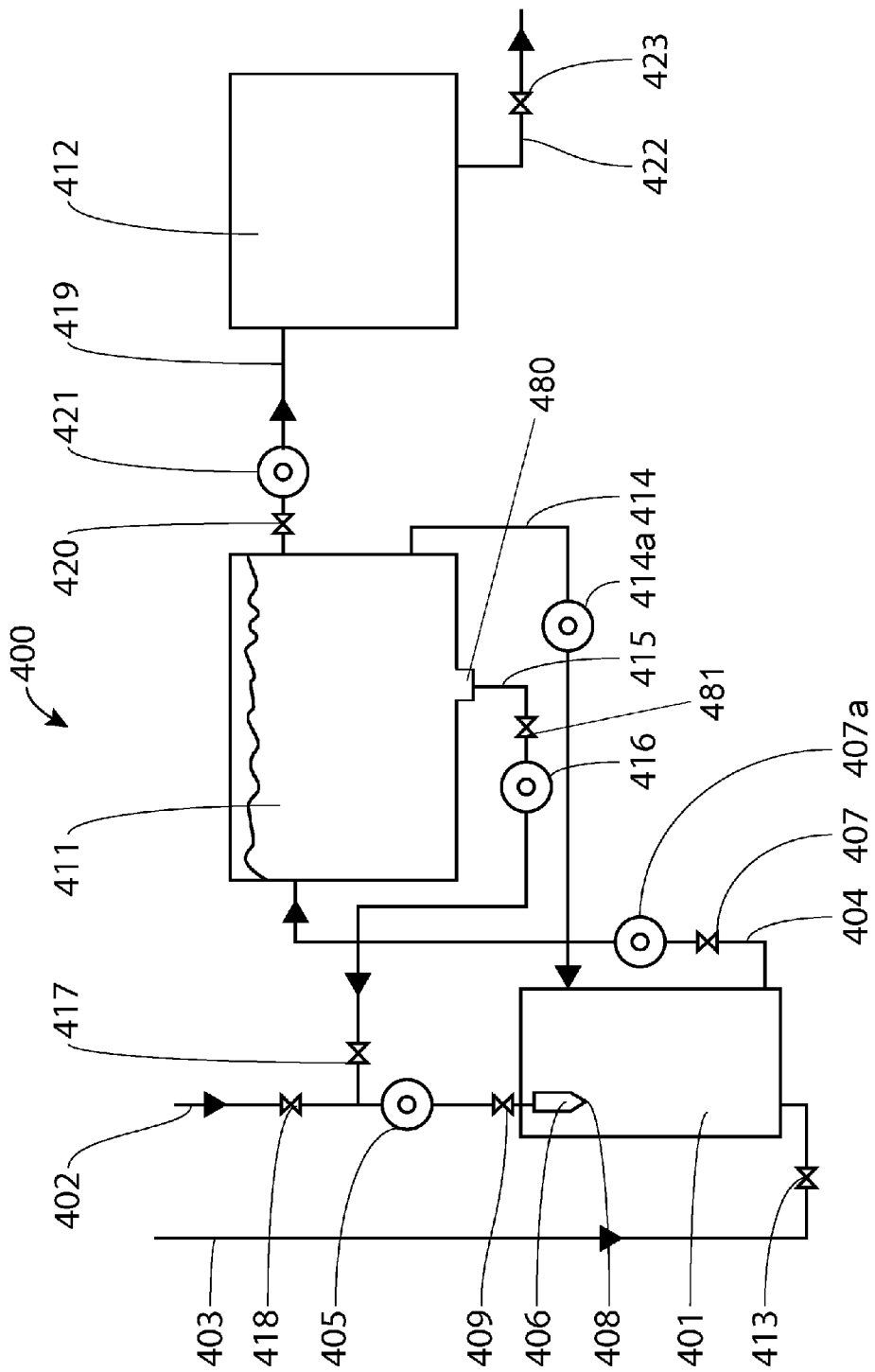
FIG. 4 schematically shows a fourth embodiment of a device according to the invention for batchwise processing.

In FIG. 4, a modified version of the device 100 for batchwise processing of FIG. 1 is shown. The device 400 comprises a first vessel 401 serving as a process vessel, a second vessel 411 serving as a secondary vessel for settling, a third vessel 412 serving as a stock vessel for storing prepared emulsion. The first vessel 401 is provided with a supply conduit 402 for aqueous first liquid which in itself is provided with a valve 418, a supply pump 405 and a valve 409, and ends in an injector 406 with injection nozzle 408 located inside the first vessel 401.

A supply conduit 403 for second liquid is provided with a filling valve 413. A discharge conduit 404 is provided with a discharge valve 407 and discharge pump 407a. The discharge conduit 404 ends in the second vessel 411, which second vessel 411 is also provided with a return conduit 414 that ends in the first vessel 401. The second vessel 411 is also provided with a drain conduit 415 that connects sump 480 of the second vessel 411 to a drain pump 416 and ends via a valve 417 at the supply conduit 402 for aqueous first liquid, after the valve 418 and before the supply pump 405.

The device 400 is also provided with a conduit 419 that starts in the second vessel 411 and ends in the stock vessel 412 via a valve 420 and a pump 421.

A discharge conduit 422 with a valve 423 is connected to the stock vessel 412.

The operation of the device 400 is similar to that of the device 100, with respect to the injection of aqueous first liquid into the first vessel 401 via the supply conduit 402 and its components.

The operation of device 400 differs from that of device 100 in that the liquid in first vessel 401 is circulated via the second vessel 411.

First, the first vessel 401 and second vessel 411 are filled with diesel via the supply conduit 403 and the discharge conduit 404, with the discharge pump 407a being in an activated state. The drain valve 481 in drain conduit 415 is in a closed state, as well as the valve 417.

The second vessel is not filled entirely in order to leave room for the injection. Now, the supply pump 405 is activated and aqueous first liquid (tap water) is injected into the first vessel 401. The discharge pump 407a provides for a continuous recirculation of liquid from the first vessel 401 via the discharge conduit 404 to the second vessel 411 and back via the return conduit 414 with return pump 414a.

Once the desired amount of aqueous first liquid has been injected into the second liquid, and the required emulsion has been obtained, the valve 420 is opened and the pump 421 activated, as a result of which the two vessels 401 and 411 are emptied into the stock vessel 412. From there on it is distributed via discharge conduit 422.

The idea of the device 400, and in particular the recirculation therein, is that the amount of aqueous first liquid injected into the second liquid is small per time unit in comparison with total amount of aqueous first liquid, in particular water to be injected, and that this will reduce the risk of coalesced water, and thus will increase the percentage of water that can be held in an emulsion without becoming unstable. This was shown in experiments discussed below.

If, in any case, for example when an emulsion has been prepared and then been standing for a while, water would segregate from the emulsion in the second vessel 411, that water will sink to the bottom, is collected in sump 480, and can be removed via the drain valve in drain conduit 415 and drain pump 416 and be injected again via the injector 406, via valve 417.

The first vessel 401, the second vessel 411, the conduits connecting them form together a circulation circuit 470.

An alternative set-up of a circulation circuit is a tube with its ends closed on itself. Injection of first liquid droplets and introduction of second liquid automatically lead to discharge of emulsion produced. This allows for performing the method for preparing an emulsion without gaseous (non-dissolved) gas present. Care should be taken that no droplets hit the wall of the tube, e.g. by introduction under an oblique angle of less than, e.g. 10° with the direction of the flow of second liquid and a nozzle with a relatively narrow spray cone.

FIG. 5 shows by way of example and schematically a truck 599 as a vehicle 599, comprising an internal combustion engine 530, and a device according to the invention 500.

The truck 599 also comprises a water tank 572 and a diesel tank 571 connected to the device 500. The water tank 572 contains heated water, for example heated using heat from the engine 530. This water is used for generating water-in-diesel emulsion using device 500. This is temporarily stored in a water-in-diesel emulsion tank 580.

An elevated temperature of the first liquid, here water, facilitates the break-up of the water when spraying, facilitating the formation of a relatively more stable emulsion. Instead or in addition, a heating means such as an electrical heating element may be present. This is also convenient to prevent the water from freezing. In addition or alternatively, the water may contain mannitol (e.g. at least 1 g/l) to lower the freezing point.

The truck 599 comprises a fuel circulation circuit 522, which in itself is known in the art, connecting the engine 530 with an intermediate fuel tank 570 for storing the fuel to be used in the engine. This intermediate fuel tank 570 is connected to the water-in-diesel emulsion tank 580 via fuel circulation circuit 523. The intermediate fuel tank 570 is also directly connected to the diesel tank 571 by a connection line 524.

In normal operation, the engine 530 of the truck 599 runs on water-in-diesel emulsion supplied from the intermediate fuel tank 570, which in turn was fed by the water-in-diesel emulsion tank 580.

Should the truck have been standing still for a long time, separation of water in the intermediate fuel tank 580 may have occurred. In such a case, the content of the intermediate fuel tank 570 can be flushed into the water-in-diesel tank 580 from where it can be passed via circulation circuit 525 to device 500 for reprocessing. This embodiment also allows for mixing pure diesel with the water-in-diesel emulsion to give the vehicle motor management the option to increase the heat of the engine, thus changing the exhaust gas composition.

Experiment I

An installation substantially according to FIG. 4 was used to prepare an emulsion of water and diesel fuel by the method of the invention. The first vessel 401 had internal dimensions of 80×25×110 mm (height×width×depth). Thus, the first 401 vessel had a first upright wall (of 25 mm wide and 80 mm high) and opposite of the first upright wall a second upright wall of the same dimensions.

Compared to FIG. 4, there were the following differences in the experimental set-up:

For the supply of fresh diesel fuel, supply conduit 403 ended in the second vessel 411.

The return circuit 414 and the discharge conduit 404 were connected to the first upright wall, with the return circuit 414 being 2 cm from the top and the discharge conduit 404 being 2 cm from the bottom of the first vessel 401.

The injector 406 was mounted in second upright wall 2 cm from the bottom, i.e. facing the opening of the supply line 414. This allowed for operation in counter flow with the spray direction from injector 406.

The first vessel 401 was made of Plexiglass®, in order to be able to observe the experiment. The second vessel 411 had a size of 3 liters.

The recirculation pump 407a and the return pump 414a were diaphragm-and-valve pumps of a type that is commercially available as a car petrol pump, with a nominal flow rate of approximately 100 ml/sec.

The pumps and valves were electronically controlled by a process computer 485.

The vessels 401 and 411 were filled with diesel, after which filling the recirculation between these vessels was started at a low speed, in order to let air escape and vessel 401 be fully filled. Then, the pump speed was increased to a flow rate of 100 ml/sec and the injection was started, at a pressure difference of 11 Bar.

This pressure difference yielded a fine droplet spray (i.e. not a jet) with a speed of 47 m/s (the speed is calculated by the flow rate divided by the diameter of the nozzle) which was introduced into the diesel.

Injection was pulsed, having a pulse time of 0.25 seconds and a waiting time between subsequent pulses of 3 second. The water supply thus obtained was approximately 0.64 ml for each pulse.

Data in summary:
1) Nozzle from Aquamist (UK) with a nozzle diameter 0.3 mm
2) Pressure: 11.5 Bar
3) Pulse duration of water spray: 0.25 sec
4) Total pulse cycle time: on-off: 0.25+1.50 sec=1.75 sec
5) Temp water: 21° C.
6) Temp diesel: 23° C.
7) Flow speed of diesel past the nozzle: 5 cm/sec in the opposite direction as the spray.
8) W was determined to be $1.5*10^3$ kg*m/N*s$^2$.

Thus, the volume of water injected per time unit was about 0.29% of the volume flow rate (measured in the same time unit) and the end concentration of water was increased to 5% of water by volume; this required a recirculation of about 17 times.

The experiment yielded a green-white colored emulsion of water-in-diesel that did not segregate as long as the recirculation lasted. After deactivation of the recirculation pump 407a and the return pump 411a, 20% of the water in the emulsion segregated after 10 minutes. Of the unsegregated remainder, approximately 15% segregated after one hour, and of the remainder thereof an additional 10% segregated after 24 hours in total. The remained unsegregated part then had a color yellow and was clear and slightly transparent. It remained stable until the end of the experiment, which was two weeks later. The latter properties are also known for a emulsions of water in diesel having a water droplet size of less than 200 nanometer; this indicates that the bigger droplets have segregated within 24 hours.

When used in a diesel engine of a car, the emulsion has shown a reduced fuel consumption, even when the fraction of water in the emulsion was as low as 0.2% by volume. The addition of water to a combustible liquid has known advantageous effects on the operation of a combustion engine using this fuel, among which are a reduction of NOx emissions and a reduction of fuel consumption leading to a reduction of costs. The advantageous effects caused by the presence of water in a fuel, such as diesel or gasoline, already occur at a relatively low concentration of water. At just 0.25 vol. % water in diesel emulsion prepared according to the present invention, the engine of an Audi A2 car ran noticeably smoother, with less soot (particulate matter exhaust) and fuel consumption was reduced.

The effect at a relatively low concentration of water is quite advantageous, because any corrosive influence of the fuel emulsion according to the invention can be expected to be less, grace to the reduced water content.

The above experiment was repeated with the following changed parameters

Pulse duration: 0.07 seconds (equal to 0.27 ml of water)
More pulses to compensate for the reduced pulse water volume
Total pulse cycle time: 5 seconds, more than required to fully flush the first vessel 101.

The emulsifying process results were improved compared the first experiment:

After deactivation of the pumps 407a and pump 411a, 15% of the water in the emulsion segregated after 10 minutes. Of the unsegregated remainder, approximately 10% segregated after one hour, and of the remainder thereof an additional 5% segregated after 24 hours in total.

Repetition of the experiment with water having a temperature of 50° C. and a W of $1.6*10^3$ kg*m/N*s$^2$ resulted in an emulsion that displayed even less segregation.

As a further advantage of a water-in-diesel emulsion as can be efficiently prepared using the method according to the invention, the combustion energy of a unit volume of fuel is increased, thus allowing for a further reduction of fuel consumption.

Without wishing to be bound by any particular theory, it is believed that the water droplets in the emulsion are so small that they help to break up the fuel upon injection into a hot engine cylinder.

A water-in-fuel such as water-in-diesel emulsion can be prepared using a land-based station (e.g. at a gas station or at a refinery where the liquid hydrocarbon fuel is prepared). In that case, the fuel is not immediately used and it is advantageous to add an emulsion stabilizing agent, which are well known in the art.

Depth Of Penetration Experiment

A glass jar having a height of 24 cm and a diameter of 16 cm was filled with diesel at a temperature of 20° C. The Aquamist 806-508B nozzle mentioned above was used, with a diameter of 0.3 mm. Water was sprayed with a single burst for 0.07 sec (corresponding with 0.27 ml at 10 Bar and 0.54 ml at 40 Bar).

TABLE 1

| Pressure (bar) | Droplet velocity (m/s) | Depth of penetration (cm) | Spray cone width (cm) | W (Kg * m)/(N * s$^2$) |
|---|---|---|---|---|
| 10 | 47 | 6 | 6 | 3015 |
| 20 | 63 | 8/10 | 10 | 4619 |
| 30 | 78 | 15 | 15 | 6078 |
| 40 | 90 | 10 | 10 | 7473 |

It can be seen from the above table that with the present invention, the depth of penetration is very limited and the method can be performed using relatively small vessels.

The table also shows that at higher pressures (40 bar), there is increased break-up. The resulting emulsion was significantly more stable, with no coalescence being observed after one day.

The experiment was repeated with a tubular pipe (diameter 10 cm) with an inlet and an outlet for diesel. The results obtained were basically the same as above, which was in accordance with expectations as the diesel flow rate in the tubular pipe was relatively small (2.9 cm/sec) compared to the initial speed of the droplets leaving the nozzle.

Preparation of a Water-in-Diesel Emulsion

The experimental setting with the tubular pipe, nozzle and spraying time was used for making a water-in-diesel emulsion.

The second vessel 411 had a storage capacity of 25 liters

The circulation pump 407a speed was 15 liter/minute, return pump 414a was removed and replaced by longer return line.

The diesel circulation lines were fitted on the flat sides of the cylinder, one in the middle and one between the nozzle and the cylinder wall.

The system was filled with 20 liters of diesel.

At 40 bar water pressure, the W-value was as above $7.4*10^3$ kg*m/N*s$^2$. The pulse duration was 0.07 second. 200 water pulses of 0.54 ml each, with a pause of 10 seconds between two consecutive pulses, resulted in 0.5% vol./vol. water in diesel.

After one hour less than 5% of the water added had separated, compared to the 30% of the first experiment.

Experiment II

Further experiments were performed with a series of vegetable oils (soy oil, sunflower, olive oil, rice bran oil, rape seed oil), and with a mineral oil (engine oil 5W30).

The experiments were performed with the following conditions:

final water concentration 0.5% vol./vol. (water/emulsion).

the second liquid was held in a relatively wide glass container (diameter 12 cm and height 13 cm; volume about 860 ml) or a relatively high glass container (diameter 6 cm and height 20 cm; volume about 500 ml).

the second liquid was stirred manually using a spatula after each pulse so as to avoid locally high concentrations of water droplets.

spraying was performed using an Aquamist nozzle (nozzle channel diameter 0.4 mm; article number 806.501C).

The spray depth of water (40 Bar; about 40° C., v about 103 m/s) in the second liquid (room temperature) was between 12 and 20 cm. W was $4.3*10^3$ kg*m/N*s$^2$. The pulse duration was 0.04 s at 0.52 ml/pulse.

For engine oil the spray depth was only 5-8 cm and water was used at a temperature of 70° C. and at 70 bar. Each 0.39 ml per pulse; final concentration of water 0.25% vol./vol. (water/emulsion).

For the vegetable oils, of the water volume injected less than 2% had separated after one hour and after 20 hours less than 15% of the water had separated. The obtained results with the vegetable oils were better than with diesel due the relatively higher viscosity of these oils, which affects the rate of settling. It should be noted that these results are very satisfactory given that no emulsion stabilization agents had been added.

For engine oil 15% of water had separated after 100 hours.

Experiment III

Experiment II was repeated with gasoline in a glass container with a diameter of 22 cm and a height of 20 cm; total volume about 1.7 liter.

When the experiment was performed with water of 40° C. and a pressure of 40 Bar, the spray depth was about 20 cm. (W was $4.3*10^3$ kg*m/N*s$^2$). The final concentration of water was 0.25% vol./vol. (water/emulsion).

After 3 minutes 10% vol./vol. of the water injected had separated, and after 30 minutes more than 90% vol./vol. of the water had separated.

The results are somewhat adversely affected because the spray did reach the bottom of the container.

Using higher values of W, better results were obtained.

With 50 Bar and 50° C. (W was $5.1*10^3$ kg*m/N*s$^2$), final concentration of water 0.036% vol./vol., less than 1% vol./vol. of water had separated after 3.5 hours.

With 70 Bar and 70° C., the pulse duration was 0.034 s at 0.52 ml/pulse. (W was $6.7*10^3$ kg*m/N*s$^2$). The final concentration of water was 0.25% vol./vol. (water/emulsion), less than 1% vol./vol. of water had separated after 30 minutes (i.e. with a final water concentration that was 14 times higher than in the previous test).

These results were similar as with the diesel experiments, but at lower water concentrations and with much higher W-numbers. This was chosen because of both the lower viscosity of gasoline and the relatively low specific mass of gasoline compared to diesel. That is, the difference with the specific mass of water is greater. Both factors adversely affect the stability. Again it should be noted that this experiment did not involve the use of an emulsion stabilizing agent.

The temperatures mentioned were estimates because the pump has an effect on the water temperature.

What is claimed is:

1. A method of preparing an emulsion comprising a first liquid and a second liquid, by dispersing the first liquid into the second liquid, comprising:
    passing the first liquid through an injection nozzle (108) to create a spray of droplets of the first liquid injected in a chamber containing the second liquid in a plurality of injections to form the emulsion; and
    providing a free path length for the spray of droplets of the first liquid from the nozzle that is larger than a penetration depth of the spray of droplets of the first liquid in the second liquid,
    such that:
    Q is at least 225 m$^2$/s$^2$, where Q is equal to the square of the speed of the droplets of the first liquid, the speed being the exit speed of the first liquid from the nozzle in air under standard temperature (20° C.) and ambient air pressure (1 atm); and
    W is at least 250 kg*m/N*s$^2$, where W is sg*Q*d divided by St, with sg being the specific gravity of the first liquid in kg/m$^3$, d being the mean Sauter droplet diameter in meter of the spray leaving the injection nozzle in air, and St is the surface tension of the first liquid in Newton/meter.

2. The method according to claim 1, wherein the temperature of the first liquid is at least 10° C. higher than the temperature of the second liquid.

3. The method according to claim 1, further comprising, before passing the first liquid through the injection nozzle to create the spray of droplets of the first liquid, at least one of i) heating the first liquid, and ii) cooling the second liquid.

4. The method according to claim 1, wherein W is at least 500 kg*m/N*S$^2$.

5. The method according to claim 1, wherein W is at least 960 kg*m/N*S$^2$.

6. The method according to claim 1, wherein W is at least 1250 kg*m/N*S$^2$.

7. The method according to claim 1, wherein W is at least 2500 kg*m/N*S$^2$.

8. The method according to claim 1, wherein W is at least 5000 kg*m/N*S$^2$.

9. The method according to claim 1, wherein the passing the first liquid through the injection nozzle to create the spray of droplets of the first liquid is performed with a fluctuating flow rate of the first liquid passed to the injection nozzle (108).

10. The method according to claim 1, further comprising passing the second liquid along the injection nozzle (108).

11. The method according to claim 1, further comprising:
providing a circulation circuit (400), comprising an injection section where the spray of droplets of the first liquid is injected into the chamber of the second liquid, and
circulating the emulsion through the circulation circuit (400) before injecting an additional amount of the first liquid into the emulsion.

12. The method according to claim 1,
wherein a circulation circuit (400) is used comprising an injection section where the spray of droplets of the first liquid is injected into the chamber containing the second liquid, and a sump (480);
the method further comprising draining a segregated portion of the first liquid from said sump (480).

13. The method according to claim 1, wherein at least one of i) the first liquid, and ii) the second liquid is subjected to a degassing treatment before injecting the spray of droplets of the first liquid is injected into the chamber containing the second liquid.

14. The method according to claim 1, further comprising:
providing a device comprising:
the chamber,
a disperser for dispersing the first liquid into the second liquid, comprising the injection nozzle (108) with an inlet for first liquid and outlet for creating the spray of droplets of the first liquid, the injection nozzle (108) opening up in the chamber, and
a pump for passing the first liquid to the injection nozzle (108);
characterized in that the pump and the injection nozzle (108) are capable of creating a spray of water droplets in air with an exit speed such that Q is at least 225 $m^2/s^2$, and achieving a W of 1,500 kg*m/N*$s^2$,
wherein the first liquid is water.

15. The method according to claim 14, further comprising providing a fluid valve arranged between the pump and the injection nozzle (108), the method further comprising:
controlling said fluid valve for varying the flow rate of first liquid passed to the injection nozzle (108).

16. The method according to claim 14, further comprising providing a circulation circuit (400), said circulation circuit (400) comprising a circulation pump for circulating the emulsion formed in the chamber, an inlet for receiving a liquid comprising the second liquid, and an outlet for discharging the emulsion from the circulation circuit, the method further comprising:
circulating the emulsion in the circulation circuit, and
discharging at least a portion of the emulsion circulating in the circulation circuit through the outlet.

17. The method according to claim 14, further comprising providing a vehicle (599) comprising a combustion engine (530) for propulsion of the vehicle (599), the method further comprising supplying the emulsion to a fuel inlet of said combustion engine (530).

18. The method according to claim 1, further comprising providing a vehicle (599) comprising a combustion engine (530) for propulsion of the vehicle (599), the method further comprising supplying the emulsion to a fuel inlet of said combustion engine (530).

* * * * *